March 11, 1958     E. A. LARSSON     2,826,155
COUPLER FOR ARTICULATED VEHICLES
Filed June 14, 1955                     6 Sheets-Sheet 2

INVENTOR.
Ernst A. Larsson
BY
ATTORNEY

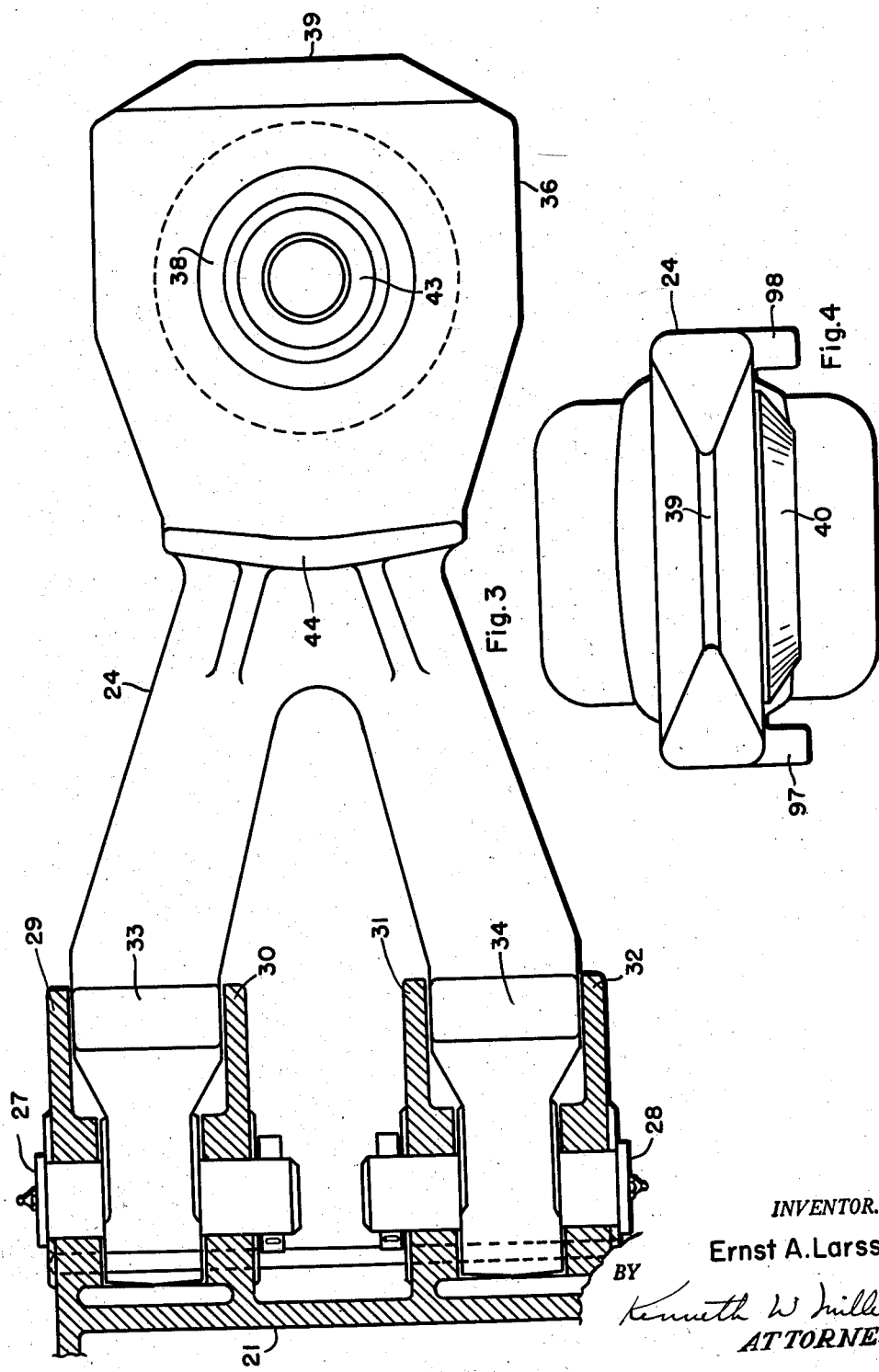

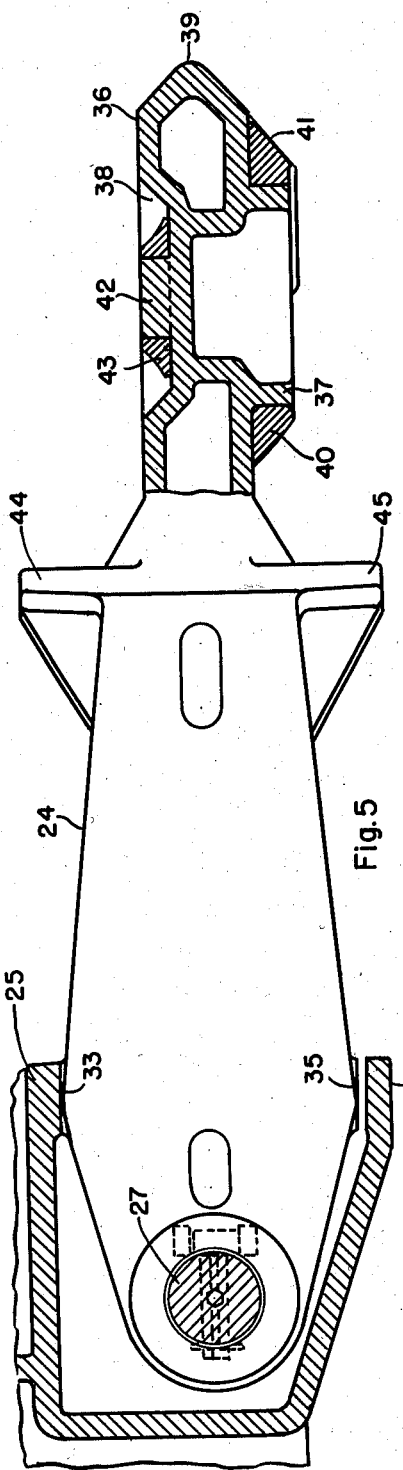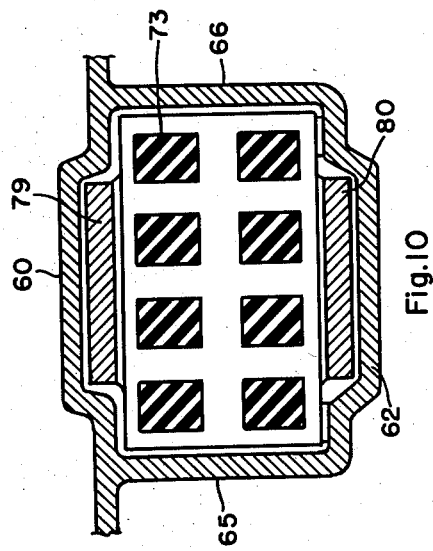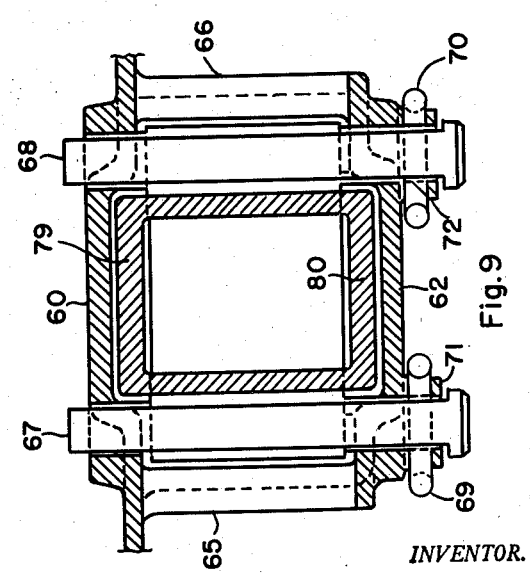

March 11, 1958 — E. A. LARSSON — 2,826,155
COUPLER FOR ARTICULATED VEHICLES
Filed June 14, 1955 — 6 Sheets-Sheet 5
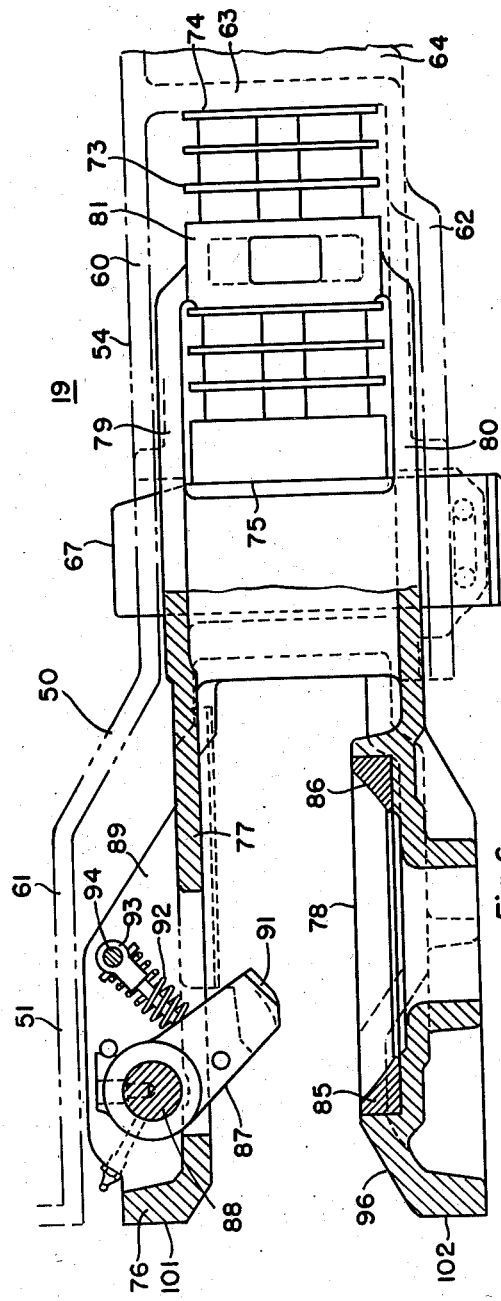
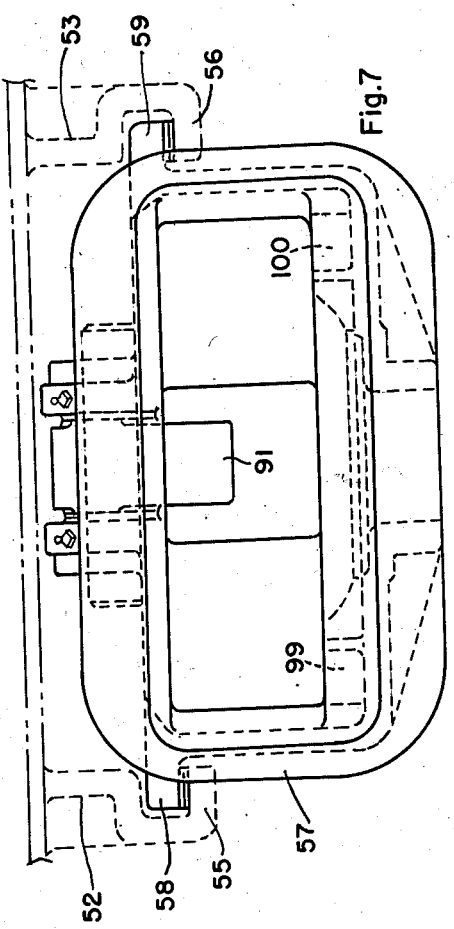
INVENTOR.
Ernst A. Larsson.
BY
Kenneth W. Miller
ATTORNEY March 11, 1958   E. A. LARSSON   2,826,155
COUPLER FOR ARTICULATED VEHICLES
Filed June 14, 1955   6 Sheets-Sheet 6

INVENTOR.
Ernst A. Larsson.
BY
Kenneth W. Miller
ATTORNEY

United States Patent Office 2,826,155
Patented Mar. 11, 1958

2,826,155

COUPLER FOR ARTICULATED VEHICLES

Ernst A. Larsson, Mansfield, Ohio, assignor to The Ohio Brass Company, Mansfield, Ohio, a corporation of New Jersey Application June 14, 1955, Serial No. 515,403

14 Claims. (Cl. 105—4)

This invention relates to car couplers and more particularly to couplers for articulated trains and vehicles.

The invention further relates to dual purpose trailers for use on rails and roads.

It has been proposed, in the art pertaining to wheeled transportation of goods, to transport the vehicular trailers ordinarily used with road tractors in the so-called door to door transport system, between the principal centers of origin and destination over the railroads which extend between such centers. Such proposals have involved either carrying the trailer upon a railway flat car, the so-called "piggy-back" method, or utilizing the trailer as one element of a train which travels on the rails of the railroad.

This invention relates to the last named method of transporting vehicular trailers on railroads and has to do principally with a coupler which is adapted to couple a following trailer with the leading trailer so as to support the front end of the following trailer from the rear end of the leading trailer and to transmit the necessary tractive and braking forces from trailer to trailer throughout the train. It is recognized that, while the problems encountered in the operation of such trains are much the same as those involved in the articulated train, so called, certain further problems arise as is set forth hereinafter. Accordingly, while in the interests of conciseness the vehicular trailer is designated herein as a car, it is intended that the term refer to the car of the usual railway train as well as to the vehicular trailer. Further, it is intended that the term articulated trains as used herein include the trailer train of the kind referred to above.

An object of the invention is to provide a coupler which is adapted to support one end of a car from the common truck utilized in articulated trains.

Another object of the invention is to provide a coupler for cars of articulated trains which will support the front end of the car and also provide draft means for transmitting tractive and braking forces.

Still another object of the invention is to provide a coupler for articulated cars which is adapted to support the weight of the following car and yet may be readily uncoupled for disconnecting the cars.

The invention, together with further objects, features and advantages thereof will be more readily apparent upon consideration of the following detailed specification and claims together with appended drawings, in which Fig. 1 is a side elevation of two cars of a trailer train according to the invention, and illustrating the application and use of the coupler of the invention;

Fig. 3 is a plan view, partly in section, of the male coupler of the invention;

Fig. 4 is an end view of the male coupler taken from the right hand end of the coupler in Fig. 3;

Fig. 5 is an elevation view, partly in section, of the male coupler of the invention;

Fig. 6 is an elevation view, partly in section, of the female coupler of the invention;

Fig. 7 is an end view of the female coupler of the invention;

Fig. 9 is a section view of the female coupler taken along the line 9—9 of Fig. 8; and Fig. 10 is a section view of the female coupler of the invention taken along the line 10—10 in Fig. 8.

Figure 1:
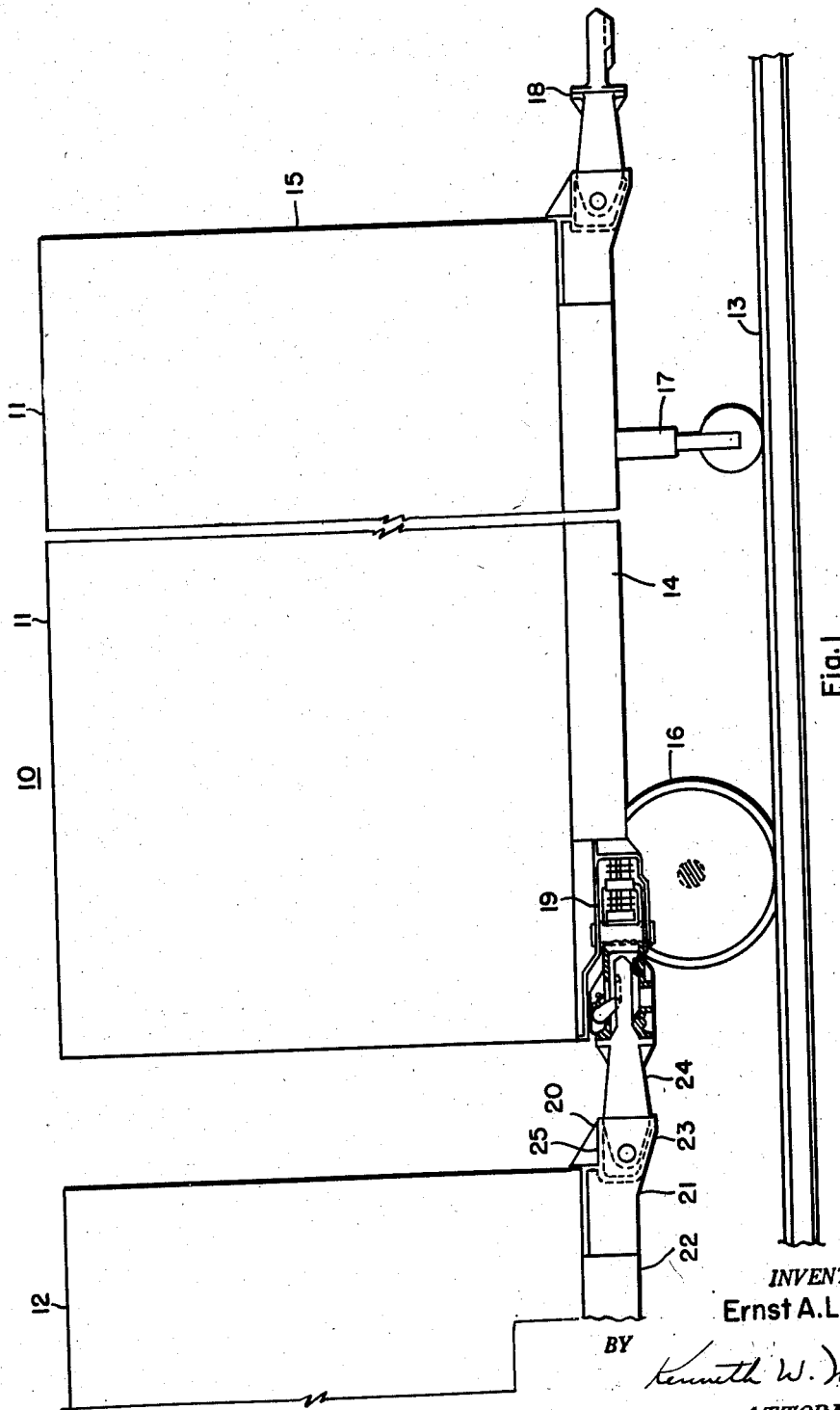

Referring now to Fig. 1 there is shown a portion of a trailer train 10 on which there are two cars 11 and 12 in place upon a track 13. Each of the cars of the train is similar in construction to the car 11 which includes a frame 14, a body 15, a truck toward the rear of the frame, of which a wheel 16 is shown, and a dolly 17 toward the front end of the car. A male coupler 18 is provided at the front end of the car and a female coupler 19 at the rear end of the car.

Cars of the type shown in Fig. 1 are adapted to be utilized as a trailer on a highway and are provided with means, not shown, for mounting rubber tired wheels suitable for such use. The cars may be coupled to the road tractor by means of the male coupler 18 or by the usual fifth wheel arrangement.

As shown in Fig. 1, the cars are coupled together to form an articulated train of cars in which the front end of the following car 12 is supported from the truck of the leading car 11 by means of the female coupler 19 at the rear end of the leading car and a male coupler 20 at the front end of the following car. The cooperating couplers 19 and 20 are useful not only to support the front end of the following car, but also to transmit the tractive and braking forces and to provide a means for readily coupling the cars when the train is made up and for uncoupling the cars when the train reaches the destination.

Referring first to the male coupler 20, the coupler includes a heavy cast housing 21 which is secured to the frame 22 of the car 12. The housing 21 has an open mouth portion 23 at the forward end thereof for receiving a tongue 24 which is pivoted about a horizontal axis and is engaged by a reinforced outwardly projecting upper portion 25 of the housing 21 to support the car 12. The tongue 24 engages and is carried by a lower portion 26 of the housing 21 when the cars are uncoupled.

As is shown in Figs. 3, 4 and 5, the tongue 24 comprises an integral Y-shaped piece and has the arms thereof pivoted upon two pins 27 and 28 which are carried by walls 29, 30, 31 and 32, respectively, extending vertically between the upper and lower portions 25 and 26 of the housing. The tongue 24 is formed with the facings 33 and 34 on the upper side thereof for engaging the upper portion 25 of the housing and corresponding facings, e. g. the facing 35 in Fig. 5 for engaging the lower portion 26 of the housing.

The forward end of the tongue 24 comprises a central member 36 having an annular projection 37 on the underside thereof and a circular depression 38 on the upper side thereof. The forward end of the member 36 is tapered from the top and bottom and on both sides to provide a leading edge 39 adapted to be guided into the female coupler. Similarly, the member is tapered from the sides thereof to the leading edge 39.

The projection 37 on the underside of the portion 36 acts as a retainer for an annular bearing member 40 which is disposed about and held by the projection 37 and the body of the tongue. The annular member 40 has a frusto-spherical outer surface 41 which cooperates with a corresponding member in the female coupler to form a universal bearing. The member 36 is formed with a projection 42 within the depression 38 which serves as a retainer for an annular member 43 and constitutes a part of a detent mechanism for holding the tongue in the female coupler.

The tongue has reinforced upwardly and downwardly extending projections 44 and 45 which are adapted to engage the female coupler to transmit buffing forces between the lead car and the following car.

Referring now to Figs. 6 and 7, the female coupler 19 comprises a housing 50 which is adapted to be secured on the upper side thereof to the underside of the trailer as shown, for example, in Fig. 1. The housing 50 comprises a rearward portion 51 having two spaced depending flanges 52 and 53 which extend along the length of the rearward portion and are integral with a forward portion 54 of the housing. The flanges 52 and 53 are of C-shape cross-section on the lower extremity thereof and are provided with bearing members 55 and 56 for supporting the receiver 57. The receiver 57 has the projecting lugs 58 and 59 which extend into the C-shaped portion of the flanges 52 and 53 and permit the receiver 57 to slide longitudinally in the housing.

Figure 8:
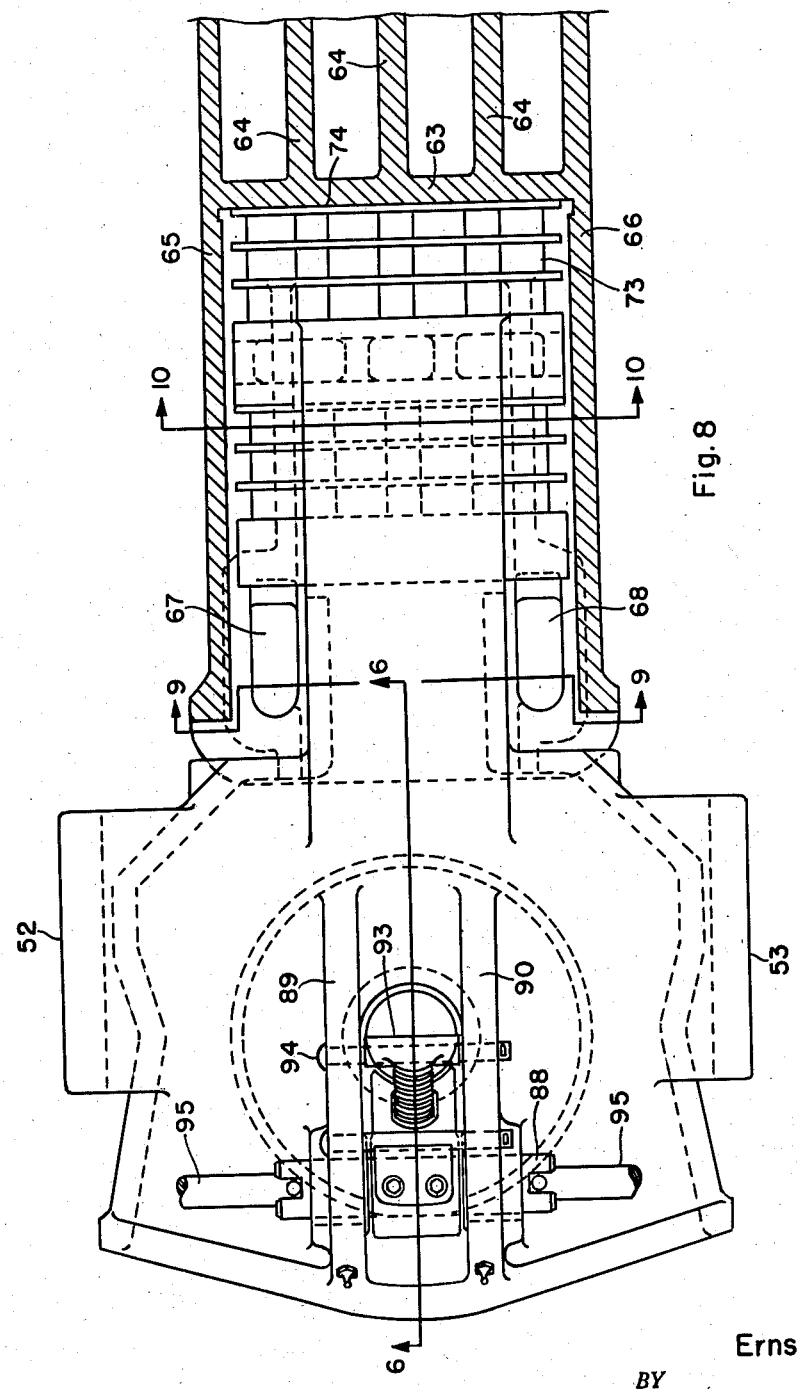
Fig. 8 is a plan view of the female coupler of the invention.

The forward portion 54 of the housing has a top wall 60 formed integrally with the top wall 61 of the rearward portion 51 and the flanges 52 and 53; a bottom wall 62; and forward end wall 63 with reinforcements 64. Two side walls 65 and 66 (see Figs. 8 and 9) extend from the front wall between the top and bottom walls to terminate short of the rearward portion 51 of the housing. The vertical keys 67 and 68 are disposed in appropriately formed openings in the top and bottom walls 60 and 62 and are held by cotters 69 and 70 which extend through openings in the keys and are held by the projections 71 and 72.

The keys 67 and 68 act as a back stop or retent for a draft gear 73, which is disposed within the forward part 60 of the housing, and serve also as lateral guide means for the forward end of the receiver as is explained hereinafter. The draft gear 73 abuts the rear face of the forward wall 63 of the housing at the front end 74 and the keys 67 and 68 at the rear end 75.

The receiver 57 comprises an integral member 76 having upper and lower parts 77 and 78 for receiving the tongue 24 of the male coupler. The member 76 is formed as a single piece with the projecting lugs 58 and 59 at the rear end thereof for supporting the receiver from the housing 51, and two longitudinal parts 79 and 80 which extend above and below the rear end of the draft gear 73 and are connected to the draft gear by the member 81. The receiver is thus free to move longitudinally in the housing, except as restrained by the draft gear 73. The receiver is constrained laterally by the flanges 52 and 53 and the keys 67 and 68.

An annular bearing member 85 is carried by the lower part 78 of the receiver member 76 and has a frusto-spherical inner surface 86 adapted to cooperate with the surface 41 of the bearing member 40 of the tongue 24. The two bearing members 40 and 85 comprise a universal bearing permitting relative turning movements of the tongue and the receiver having both vertical and horizontal components.

Figure 2:
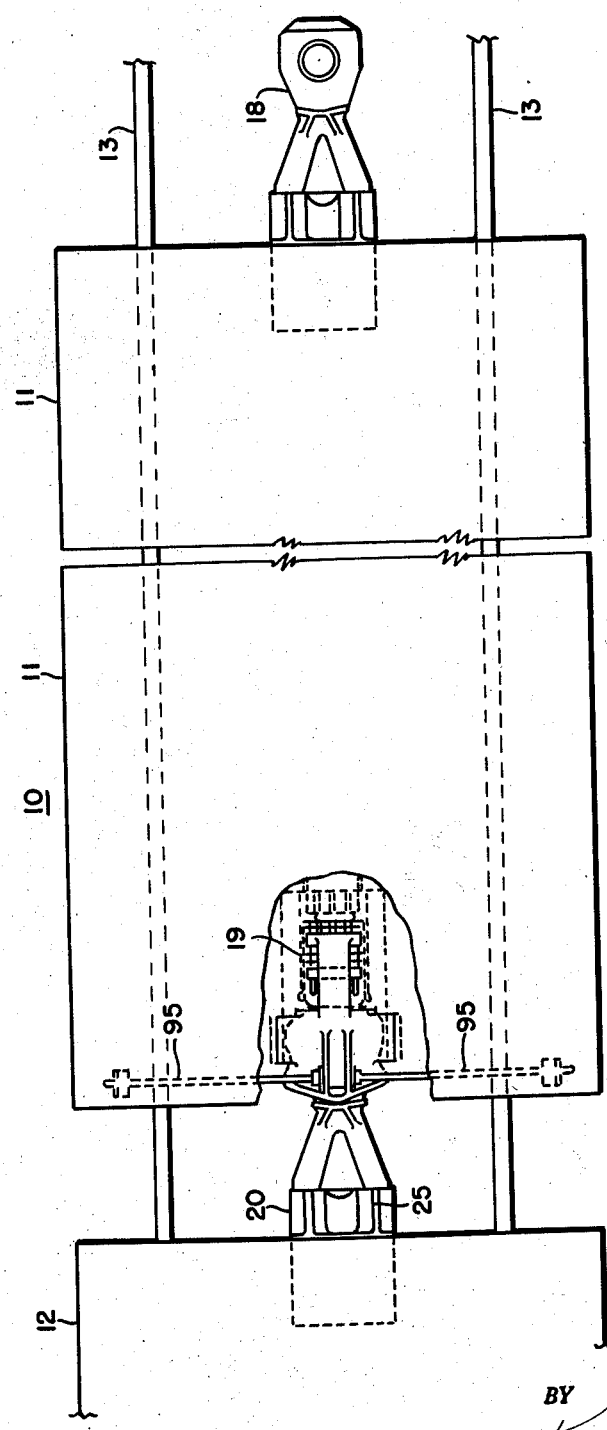
Fig. 2 is a plan view, partly broken away, of the cars and coupler of Fig. 1.

A detent mechanism 87 is carried by the upper part 77 of the receiver member 76. A shaft 88 is supported by two upstanding ribs 89 and 90 and a cam 91, secured to the shaft 88 between the ribs, is arranged to pass through an opening 92 in the upper part 77 of the member 76. The cam 91 is held in a normally engaged position by a spring 92 carried by a collar 93 which is in turn supported by a pin 94 extending between the ribs 89 and 90. The detent 87 is operated by means of a shaft 95 which extends to the side of the car. (See Fig. 2.)

The lower part 78 of the member 76 has an inclined surface 96 which serves as a guide for the tongue and is adapted to be engaged by the depending fins 97 and 98 (Fig. 4) on the underside of the tongue 24. The fins are received in two recesses 99 and 100 which extend along the bearing member 85 at either side thereof and permit the tongue to drop into position with the bearing member 40 engaged with the bearing member 85. The cam 91 is normally engaged with the bearing member 43 in the depression 38 of the tongue.

The end faces 101 and 102 of the receiver parts 77 and 78 are arranged to be engaged by the projections 44 and 45 on the tongue. The faces serve as a buffer means for limiting the forces which are applied to the draft gear 73.

The draft gear 73 is of the type having alternate rubber cushioning and spacer plates. Such draft gears are well known in the art.

In operation, when the cars 11 and 12 are separated, the tongue 24 of the male coupler is supported by the lower portion 26 of the housing 21 at about the level of the entrance portion of the receiver 57 of the female coupler 19. As the cars 11 and 12 are brought together, the leading edge 39 of the tongue 24 engages the inclined surface 96 and lifts the tongue until the depending fins 97 and 98 also engage the surface 96 and lift and carry the portion 36, and particularly the bearing member 40, into the receiver until the bearing member 40 is disposed above the bearing member 85 of the receiver. The fins 97 and 98 then drop into the recesses 99 and 100 and the tongue drops into position with the bearing member 40 and engages with the bearing member 85 and the cam 91 engaged with the bearing member 43 of the tongue. The coupler may be released by turning the shaft 95 to operate the detent mechanism 87.

It is to be understood that the foregoing description is not intended to restrict the scope of the invention and that various rearrangements of the parts and modifications of the design may be resorted to, giving effect to a liberal interpretation to the claims as herein set forth.

I claim

1. In combination, a leading car having supporting wheels toward the rear end and a trailing car supported at the front end by the leading car and coupling means comprising a female coupler on the leading car including a housing attached to the frame of the car, a receiver carried by the housing and adapted to slide longitudinally in the housing, and a draft gear connecting the receiver and the housing for transmitting draft and buffing forces, a universal bearing member in the receiver at the bottom part thereof, and a male coupler on the trailing car comprising a housing attached to the frame of the car, a horizontal pin in the housing and a tongue pivoted on the pin and extending forward into the receiver, the said tongue having a universal bearing member on the under side of the front end of the tongue engaged with the universal bearing member in the receiver, and a forwardly projecting portion on the housing of the male coupler engaged with the upper portion of the tongue ahead of the pin for supporting the trailing vehicle.

2. In combination, a leading car having supporting wheels toward the rear end and a trailing car supported at the front end by the leading car and coupling means comprising a female coupler on the leading car including a housing attached to the frame of the car, a receiver carried by the housing and adapted to slide longitudinally in the housing, a draft gear connecting the receiver in the housing for transmitting draft and buffing forces, a universal bearing member in the receiver at the bottom part thereof, and a detent at the top part thereof, and a male coupler on the trailing car comprising a housing attached to the frame of the car, a horizontal pin in the housing and a tongue pivoted on the pin and extending forward into the receiver, the said tongue having a universal bearing member on the underside of the front end of the tongue engaged with the universal bearing member in the receiver, a projecting piece on the tongue for engaging the buffer of the receiver and a bearing member on the upper side of the tongue engaged by the detent for holding the tongue with the bearing member thereof engaged with the bearing member of the receiver, and a forwardly projecting portion on the housing of the male coupler engaged with the upper portion of the tongue ahead of the pin for supporting the trailing vehicle.

3. In coupling apparatus for articulated trains in combination, a male coupler comprising a housing, a horizontal pin and a tongue pivoted on the pin and projecting forwardly from the housing, a bearing member on the underside of the tongue toward the forward end thereof and a bearing member on the housing engaged with the tongue for supporting a car carried by the male coupler, a female coupler comprising a housing, a receiver with the tongue of the male coupler received at the rear end thereof and bearing means for permitting the receiver to slide longitudinally in the housing and a draft gear interconnecting the front end of the receiver with the housing, the said receiver having a universal bearing member engaged by and supporting the universal bearing member of the tongue and detent means for holding the tongue in the receiver.

4. In coupling apparatus for articulated trains, in combination, a male coupler comprising a housing, a horizontal pin and a tongue pivoted on the pin and projecting forwardly from the housing, a universal bearing member on the underside of the tongue toward the forward end thereof and a bearing member on the housing above the tongue engaged with the top of the tongue for supporting a car carried by the male coupler, and a female coupler comprising a housing, a receiver having the tongue of the male coupler received therein and a universal bearing member on the underside of the receiver engaged with the bearing member of the tongue, detent means on the upper side of the receiver for holding the bearing members together and the tongue in the receiver, bearing means for permitting the receiver to slide longitudinally in the housing and a draft gear interconnecting the front end of the receiver with the housing.

5. In coupling apparatus for articulated trains, in combination, a male coupler comprising a housing, a horizontal pin and a tongue pivoted on the pin and projecting forwardly from the housing, a universal bearing member on the underside of the tongue toward the forward end thereof, an outwardly projecting portion on the tongue behind the bearing member, and a bearing member on the housing above the tongue engaged to the top of the tongue for supporting a car carried by the male coupler, and a female coupler comprising a housing, a receiver having the tongue of a male coupler received therein and a universal bearing member on the underside of the receiver engaged with the bearing member of the tongue and detent means on the upper side of the receiver for holding the bearing members together and the tongue in the receiver, and means of the receiver engaged by the projecting means on the tongue for holding the receiver and the male coupler of housing in a predetermined spaced apart relation, support means for holding the receiver in the housing and a draft gear interconnecting the front end of the receiver with the housing.

6. In coupling apparatus for articulated trains, in combination, a male coupler comprising a housing, a horizontal pin and a tongue pivoted on the pin and projecting forwardly from the housing, a universal bearing member on the underside of the tongue toward the forward end thereof, an outwardly projecting portion on the tongue behind the bearing member, and a bearing member on the housing above the tongue engaged with the top of the tongue for supporting a car carried by the male coupler, and a female coupler comprising a receiver with a forwardly extending opening and the tongue of the male coupler received therein, a universal bearing member in the underside of the receiver engaged with the bearing member of the tongue and detent means in the upper side of the receiver for holding the bearing members together and the tongue in the receiver, a housing for carrying the receiver including support means and bearing means for permitting the receiver to slide longitudinally in the housing, and a draft gear interconnecting the front end of the receiver with the housing.

7. In coupling apparatus for articulated trains, in combination, a male coupler comprising a housing, a horizontal pin and a tongue pivoted on the pin and projecting forwardly from the housing, a universal bearing member on the underside of the tongue toward the forward end thereof and a bearing member on the housing engaged with the tongue for supporting the underside of a car carried by the male member, a female coupler comprising a housing, a receiver with the tongue of the male coupler received at the rear thereof and bearing means for permitting the receiver to slide longitudinally in the housing and a draft gear interconnecting the front end of the receiver with the housing, the said receiver having a universal bearing member at the bottom part thereof engaged by and supporting the universal bearing member of the tongue and detent means for holding the tongue in the receiver, and projections on the tongue behind the universal bearing member and engaging surfaces on the receiver for transmitting buffing forces between the two couplers.

8. A male coupler comprising a housing having an open forward portion with spaced horizontally disposed walls and vertical partitions extending between the walls, a horizontal pin carried by the said partitions and a tongue pivoted on the pin and adapted to be engaged on the upper side thereof by the upper wall to carry the weight of a car to which the coupler is attached and adapted to engage the lower wall on the underside thereof to support the tongue, an annular bearing member on the underside of the front end of the tongue, and a buffer piece projecting outwardly from the tongue behind the bearing member.

9. A female coupler comprising a housing having a top portion and two spaced depending portions toward the rear thereof with inwardly directed parts and an enclosed portion toward the front thereof, a receiver arranged to slide longitudinally in the enclosed portion and having two projecting members at the sides thereof for engaging the dependent portions of the housing member to support the coupling member, a draft gear extending between the forward end of the housing and the receiver and two spaced projecting arms on the receiver extending along the draft gear and connected thereto at the center part of the draft gear for transmitting buffing and drafting forces from the receiver to the housing, and guide means at each side of the receiver supported by the housing for guiding the fore and aft movement of the receiver, the said receiver being open at the rear and having a sphero concave bearing member at the bottom of the open portion of the member and a detent above the bearing member for engaging and restraining the tongue of a male coupler carried by the bearing member.

10. The invention in accordance with claim 9 in which the entrance portion of the receiver at the rear end thereof has inclined surfaces for guiding the tongue of a male coupler into the mouth of the coupling member.

11. The invention in accordance with claim 9 in which the entrance portion of the receiver at the rear end thereof has inclined surfaces for engaging depending fins at each side of the bearing member of a tongue of a male coupler for guiding the tongue into the receiver, and recesses at each side of the bearing for receiving the guide fins of the tongue when the bearing portion of the tongue is seated in the bearing of the coupling member.

12. The invention in accordance with claim 9 in which the draft gear is held at the rear end thereof by two spaced pins carried by the housing and the spaced projecting arms on the receiver extend between the pins and along the draft gear.

13. In coupling apparatus, in combination, a male coupler comprising a housing, a horizontal pin and a tongue pivoted on the pin, an annular part mounted on the tongue toward the forward end thereof having a spherical bearing surface, and a forwardly extending portion on the housing above the tongue engaged with the top of the tongue to support the forward end of a car carried by the male coupler, and a female coupler comprising a receiver with the tongue of the male coupler received therein, a recess in the bottom of the interior part of the receiver having a spherical bearing surface engaged with the surface of the annular member on the tongue and detent means on the top of the receiver engaged with the tongue for holding the bearing surfaces together and the tongue in the receiver, a housing for carrying the receiver including downwardly extending portions on each side of the receiver and laterally extending lugs on the receiver carried thereby, a draft gear carried by the housing, and means connecting the receiver to the draft gear.

14. In a coupling apparatus, in combination, a male coupler comprising a housing, a horizontal pin and a tongue pivoted on the pin, an annular part mounted on the tongue toward the forward end thereof having a spherical bearing surface, and a forwardly extending portion on the housing above the tongue engaged with the top of the tongue to support the forward end of a car carried by the male coupler, and a female coupler comprising a receiver with the tongue of the male coupler received therein, a recess in the bottom of the interior part of the receiver having a spherical bearing surface engaged with the surface of the annular member on the tongue and detent means on the top of the receiver engaged with the tongue for holding the bearing surfaces together and the tongue in the receiver, a housing for carrying the receiver including downwardly extending portions on each side of the receiver and laterally extending lugs on the receiver carried thereby, a mat type draft gear supported at the front end thereof by the housing and at the rear end thereof by two spaced pins carried by the housing, and yoke means extending forwardly from the receiver between the pins and attached to the draft gear intermediate the ends thereof for transmitting draft and buffing forces between the housing and the receiver.

References Cited in the file of this patent

UNITED STATES PATENTS

| | | | |
|---|---|---|---|
| 505,287 | Crowley | | Sept. 19, 1893 |
| 538,533 | Munson | | Apr. 30, 1895 |
| 811,329 | Rooney | | Jan. 30, 1906 |
| 2,150,818 | Bramley | | Mar. 14, 1939 |

FOREIGN PATENTS

| | | |
|---|---|---|
| 5,361 of 1890 | Great Britain | Apr. 8, 1890 |